United States Patent [19]

Newell et al.

[11] Patent Number: 4,803,720

[45] Date of Patent: Feb. 7, 1989

[54] DUAL PLANE CROSS POINT SWITCH ARCHITECTURE FOR A MICRO-PBX

[75] Inventors: Darryl C. Newell, Boca Raton, Fla.; Karl F. Schroeder, Gaithersburg; Bruce J. Wilkie, Ijamsville, both of Md.

[73] Assignee: International Business Machines Corporation, Armonk, N.Y.

[21] Appl. No.: 910,055

[22] Filed: Sep. 22, 1986

[51] Int. Cl.⁴ .................................... H04M 3/56
[52] U.S. Cl. ........................... 379/202; 379/201; 379/292; 379/216
[58] Field of Search ............... 379/291, 271, 292, 306, 379/165, 250, 335, 202, 203, 204, 205, 216

[56] References Cited

U.S. PATENT DOCUMENTS

| | | |
|---|---|---|
| 3,531,773 | 2/1968 | Beebe . |
| 3,544,726 | 12/1970 | Wimberly ........................ 379/207 |
| 3,546,394 | 12/1970 | Platt et al. ........................ 379/195 |
| 3,577,125 | 5/1971 | Frisbie . |
| 3,588,827 | 6/1971 | Hoffman et al. . |
| 3,792,200 | 2/1974 | Altenburger et al. .......... 379/271 X |
| 3,792,202 | 2/1974 | Adams, Jr. et al. ............. 379/195 |
| 3,814,862 | 6/1974 | Eddy ............................... 379/272 |
| 3,828,314 | 8/1974 | Bradbery et al. ................ 379/270 |
| 3,865,979 | 2/1975 | Hestad ............................ 379/276 |
| 3,891,801 | 6/1975 | Wang .............................. 379/206 |
| 3,903,373 | 9/1975 | Gueldenpfennig et al. ..... 379/203 |
| 3,928,730 | 12/1975 | Aagaard et al. ................. 379/275 |
| 4,008,376 | 2/1977 | Flanagan et al. ............... 379/206 |
| 4,046,966 | 9/1977 | Urui ................................ 379/204 |
| 4,075,608 | 2/1978 | Koenig ........................... 340/166 |
| 4,153,817 | 5/1979 | D'Ortenzio ...................... 379/62 |
| 4,232,198 | 11/1980 | Warman ......................... 379/196 |
| 4,424,418 | 1/1984 | Moore et al. ................... 379/204 |

FOREIGN PATENT DOCUMENTS 0141234 9/1984 European Pat. Off. .
1411189 10/1975 United Kingdom .

OTHER PUBLICATIONS

COS/MOS 4×4 Crosspoint Switch with Control Memory, Digital Integrated Circuits, RCA Solid State Division, File No. 1076.

J. Lemp, Jr., "The 805A PBX-A Switching Bargain for Small Businesses," Bell Labs Record, vol. 51, No. 5, May 1973, pp. 136-142, see p. 138.

Witschi et al., "Application of Operational Amplifier Techniques..." IEEE NE Elec. Research & Engineering Meeting, 9/3/65, pp. 30-31.

Primary Examiner—James L. Dwyer
Attorney, Agent, or Firm—John E. Hoel

[57] ABSTRACT

The invention is a software reconfigurable cross point switch which selectively interconnects a plurality of phone lines and a plurality of shared resources such as call progress monitors, dual tone multifrequency (DTMF) receivers, DTMF automatic dialers and automatic answer tone detectors. The invention achieves its objective of enhanced switching efficiency and greater flexibility in the connectivity between diverse communications elements, by independently switching two separate switching planes of the cross point switch so as to enable different paths to be taken by the transmit portion and the receive portion of a particular telephone connection.

The cross point switch architecture invention flexibly allows for many applications, one in particular being conference summing. By providing a plurality of build-out resistors connected to the separate inputs of one plane of the cross point switch, and connecting the corresponding outputs from the cross point switch to a single input of the summing amplifier, a conference summing function can be performed.

1 Claim, 8 Drawing Sheets

SYSTEM BLOCK DIAGRAM

MICRO PBX 34

RECEIVE SWITCH 36

TRANSMIT SWITCH 38

MANUAL DIALING WITH STORAGE OF LAST NUMBER DIALED

FSK MODEM TRANSMIT AND RECEIVE

CONFERENCE SUMMING

DUAL PLANE CROSS POINT SWITCH ARCHITECTURE FOR A MICRO-PBX

DESCRIPTION

BACKGROUND OF THE INVENTION

1. Technical Field

The invention disclosed broadly relates to data processor control of telephone switching and more particularly relates to telephone communication path switching in a personal computer system.

2. Background Art

The problem of selectively connecting a first plurality of telephone lines to a second plurality of telephone lines has been achieved in the prior art by means of complex gang switching arrangements which simultaneously connect both the transmit and the receive line of a particular communications session. An example of this prior art is U.S. Pat. No. 4,075,608 to Koenig, which shows a plural stage switch matrix under the control of a minicomputer. The plural stages of the matrix are gang switched so that both the transmit and the receive path for a particular telephone link, are simultaneously switched along the same path. As telephone technology has advanced, a wide variety of auxiliary telephone signal processing elements has evolved, for example call progress monitors which monitor the sequence of trunk connections by means of the characteristic signal tones transmitted over the link. In addition, dual tone multifrequency transmitters and receivers enable the user to transmit call establishment signals over the network. Other devices such as automatic dialers and answer tone detectors enable the automatic establishment of calls between unattended stations. In such a diverse telephonic network, where some elements are limited to transmission whereas other elements are limited to reception of signals, it is inefficient to simultaneously gang switch both the transmit and the receive paths for a particular telephonic session, and indeed such simultaneous gang switching as is practiced by the prior art limits the flexibility in the connectivity of a modern telephone system.

OBJECTS OF THE INVENTION

It is therefore an object of the invention to improve the efficiency of switching diverse components in a telephonic communication system.

It is still another object of the invention to provide a more flexible connectivity for a diverse component telephone communication system.

It is still a further object of the invention to provide an improved conference summing means for connecting a plurality of telephone lines in a conference interconnection.

SUMMARY OF THE INVENTION

These and other objects, features and advantages of the invention are accomplished by the cross point switch architecture for a micro-PBX, disclosed herein. The invention is a software reconfigurable cross point switch which selectively interconnects a plurality of phone lines and a plurality of shared resources such as call progress monitors, dual tone multifrequency (DTMF) receivers, DTMF automatic dialers and automatic answer tone detectors. The invention achieves its objective of enhanced switching efficiency and greater flexibility in the connectivity between diverse communications elements, by independently switching two separate switching planes of the cross point switch so as to enable different paths to be taken by the transmit portion and the receive portion of a particular telephone connection.

The cross point switch architecture invention flexibly allows for many applications, one in particular being conference summing. By providing a plurality of build-out resistors connected to the separate inputs of one plane of the cross point switch, and connecting the corresponding outputs from the cross point switch to a single input of the summing amplifier, a conference summing function can be performed.

BRIEF DESCRIPTION OF THE DRAWINGS

These and other objects, features and advantages of the invention will be more fully appreciated with reference to the accompanying figures.

DESCRIPTION OF THE BEST MODE FOR CARRYING OUT THE INVENTION

Figure 1:
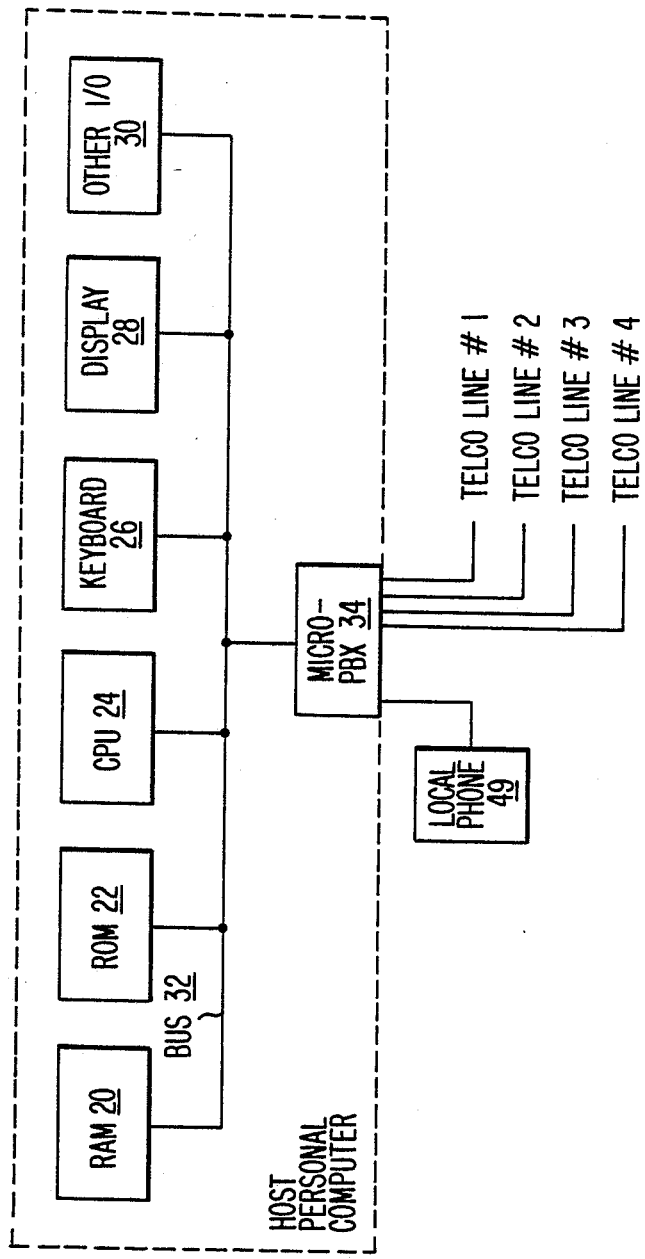
FIG. 1 is a system block diagram of the invention.

In the system block diagram of FIG. 1, the host Personal Computer is depicted as including the random access memory (RAM) 20, the read only memory (ROM) 22, the central processing unit (CPU) 24, the keyboard 26, the display 28, and other input/output (I/O) devices 30, interconnected by the address and data bus 32. Also depicted in FIG. 1 is the micro-PBX 34 connected to the bus 32, which is the feature of particular interest herein. The micro-PBX 34 functions to interconnect the local phone 49 to the public telephone (Telco) lines #1, #2, #3 and #4, under control of the stored program instructions contained in the RAM 20 of the host Personal Computer. The micro-PBX 34 can be embodied as an I/O adapter card which will plug into the I/O adapter bus of the IBM Personal Computer, and will operate by issuing interrupts to the CPU 24, in the manner described in the copending U.S. patent application Ser. No. 770,541, filed Aug. 29, 1985 by David J. Bradley, et al. entitled "System for Managing a Plurality of Shared Interrupt Handlers in a Linked-List Data Structure," assigned to the IBM Corporation and incorporated herein by reference.

Figure 2:
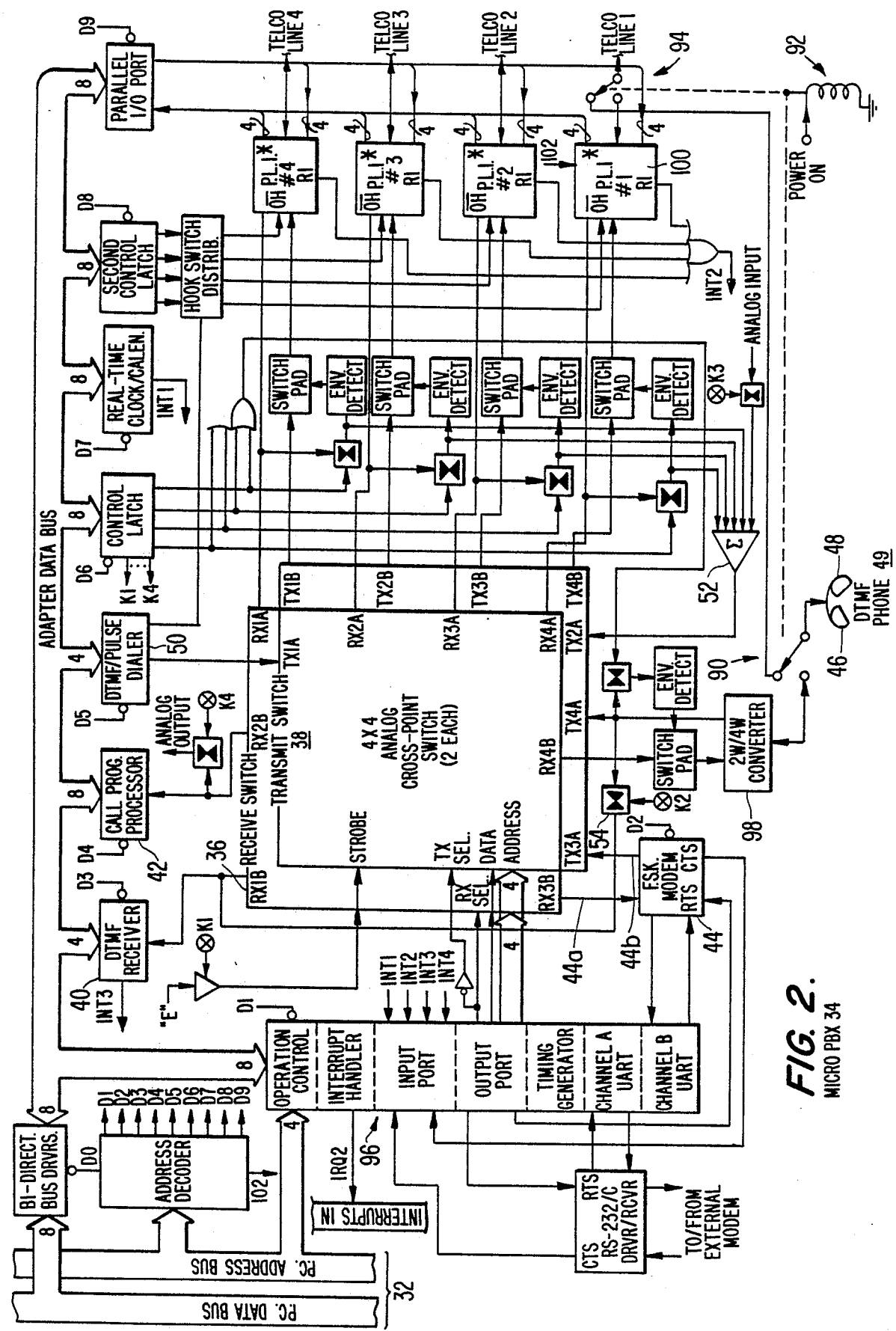
FIG. 2 is a more detailed block diagram of the micro-PBX 34.

The micro-PBX is shown in greater detail in the block diagram of FIG. 2 wherein the data bus and address bus 32 is shown connected through the bidirectional bus driver to the adapter data bus. The adapter data bus in FIG. 2 provides inputs to the dual tone multifrequency (DTMF) receiver 40, the call progress monitor 42, the DTMF/pulse dialer 50, the control latch, the real time clock/calendar, the second control latch and the parallel I/O port, and further to the control block 96. The control block 96 includes the operation control, the interrupt handler and the input port and output port, which are described in greater detail in the above referenced, copending patent application to David J. Bradley, et al. The control block 96 further includes a timing generator, a channel A universal asynchronous receiver transmitter (UART) and the channel B UART. the UARTs are conventional universal asynchronous receiver transmitters which provide an interface between a digital source of information and a modulator/demodulator such as is shown between the channel B UART and the frequency shift key (FSK) modem 44. The address bus 32 also provides an input to the address decoder of FIG. 2 which provides control outputs D0 through D9 and 102 to various elements shown in FIG. 2. The Telco lines #1, #2, #3 and #4 are shown connected to the phone line interfaces (PLI) such as the PLI 100 and the local DTMF phone 49 is shown with its receiver 46 and transmitter 48 connected through the relay 90 to the two-wire to four-wire converter (2 W/4 W converter) 98. Before the power is turned on to the micro-PBX 34 of FIG. 2, the coil 92 is not energized and therefore the relay 90 and the relay 94 are positioned so that the telephone 49 is directly connected to the Telco line 1. When power is turned on the coil 92 is then energized and the Telco line 1 is connected to its respective phone line interface (PLI) and the DTMF telephone 49 is connected to the converter 98. Four interrupt signals INT1 through INT4 are generated in the micro-PBX 34 of FIG. 2. For example the INT3 is generated by the DTMF receiver 40 when the receiver 40 receives a dual tone multifrequency signal from a telephone line. In response to receipt of such signal, the DTMF receiver 40 outputs the INT3 interrupt signal to the input port of the control block 96 which, in response thereto, has the interrupt handler output an IRQ2 signal on the interrupt bus to the CPU 24, in accordance with the David J. Bradley, et al, copending patent application, cited above. A conference summing amplifier 52 is shown in FIG. 2 having five analog inputs, four from the Telco lines #1, #2, #3 and #4 and the fifth from an analog input which can be connected by means of the gate energized by control signal K3. The summing amplifier 52 can provide an analog sum of the input analog signals and apply them to connected telephone receivers to provide conference calling capability.

Figure 3:
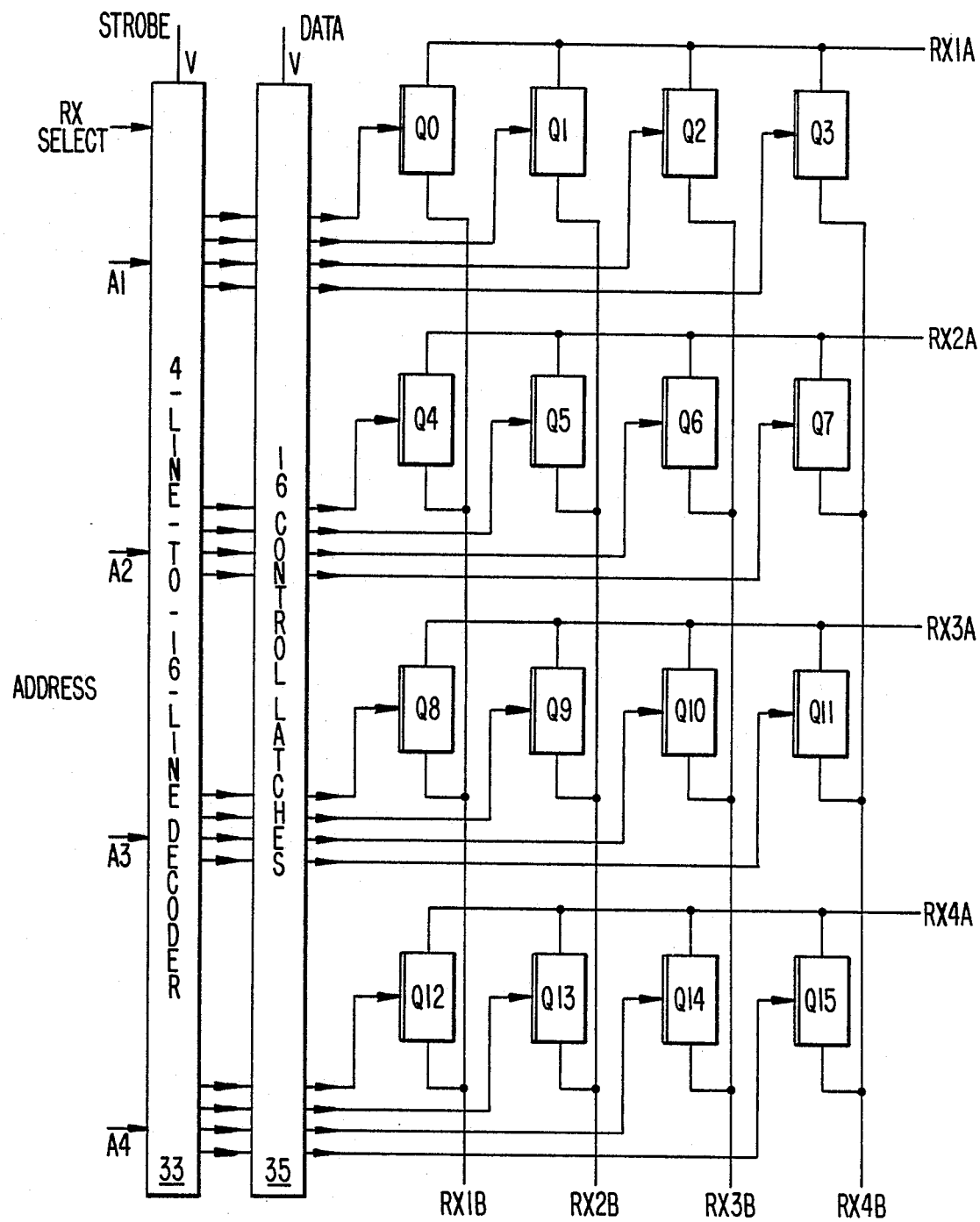
FIG. 3 is a more detailed circuit diagram of the receive switch 36.
Figure 4:
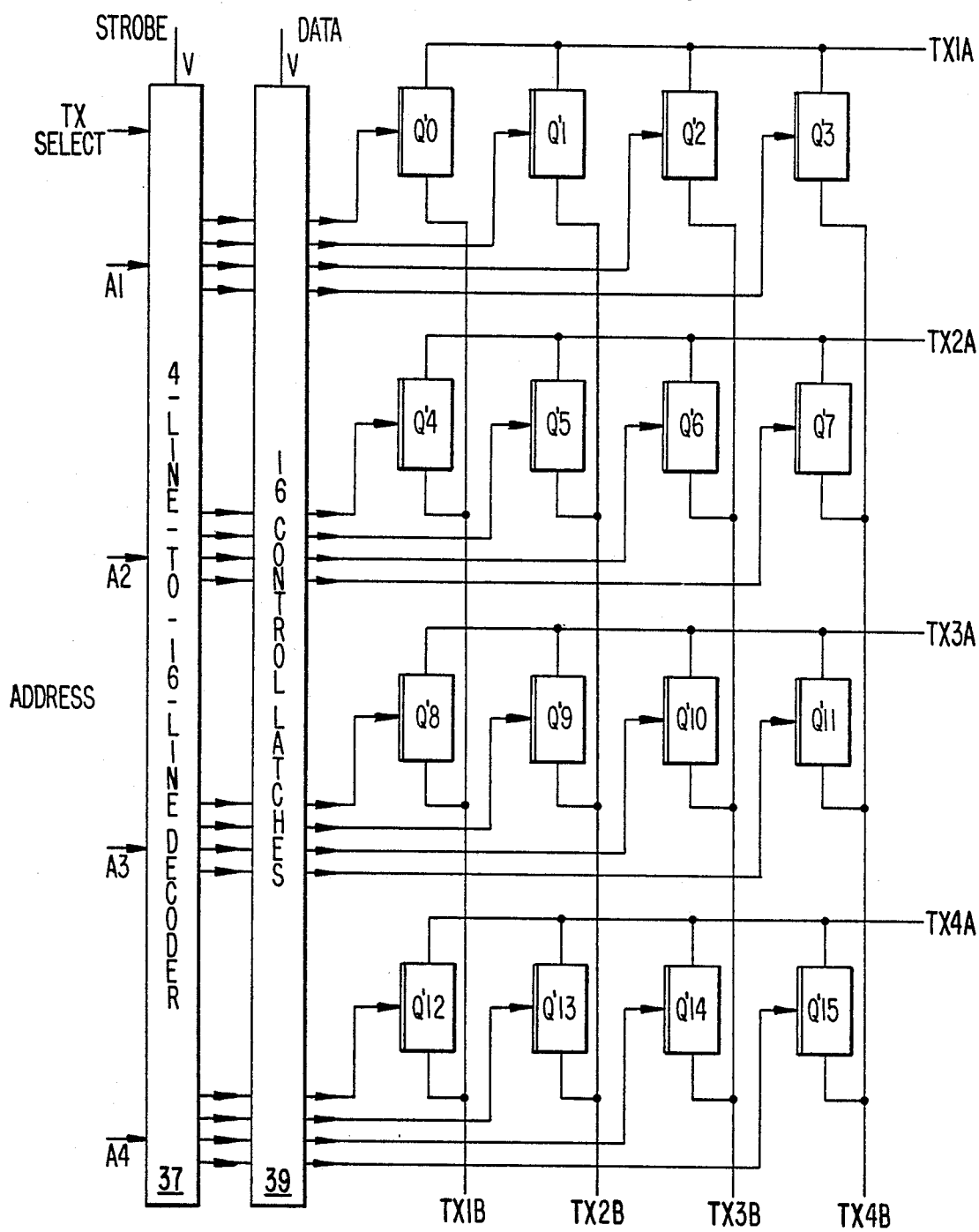
FIG. 4 is a detailed circuit diagram of the transmit switch 38.

In accordance with the invention, a dual plane cross point switch is provided in the form of a receive switch 36 constituting the first plane and the transmit switch 38 constituting the second plane. The receive switch 36 is shown in greater detail in FIG. 3 and the transmit switch 38 is shown in greater detail in FIG. 4.

The receive switch 36 consists of an array of transfer gates Q0 through Q15 whose respective conduction paths, which can conduct a signal in either direction, are controlled by the address A1 through A4 applied to the four line-to-16 line decoder 33 whose output is connected to the 16 control latch block 35. When the four-bit binary address A1 through A4 is applied to the decoder 33, it is translated into one of 16 energized signals on the lines connected to the latch block 35, when an RX select signal is applied to the decoder 33 and the strobe signal is present on the decoder 33. The corresponding energized one of the 16 latches in the latch block 35 then is set to either a zero or a one state in accordance with the zero or one binary value applied to the data terminal of the latch. If a binary value of one is applied to the data terminal, then the particular one of the connected cross point switch elements Q0 through Q15 being address, is turned on and becomes conductive, otherwise if the data is zero, the element is turned off. As an example, if a numerical value of five having a binary expression 0101, were applied to the address inputs of decoder 33 when the RX select line is on and the strobe line is on, then the fifth line of 16 lines output from the decoder 33 would be enabled as an input to the latch block 35. The fifth latch of the 16 latches in the latch block 35 would then be conditioned to be set to the state of the data input to the latch block 35. If the data value is a binary one, then the fifth latch in the latch block 35 will be turned on. This will enable the cross point switching element Q5 in the array of FIG. 3 to become conductive, providing a bidirectionally conductive path from the vertical line RX2B to the horizontal line RX2A. The transmit switch 30 of FIG. 4 operates in a similar manner, and accepts the same four bits of binary address A1 through A4, but is selected by the TX select line. When the proper address is applied to the decoder 37, the corresponding latch in the control latch block 39 is conditioned to be set to the state of the input data to the block 39, thereby appropriately setting the cross point switch element Q'0 through Q'15, in a manner similar to that described for the receive latch 36.

Returning to the micro-PBX 34 of FIG. 2, it can be seen that the receive switch 36 has as its inputs the Telco receive line #4 on RX1A, the Telco receive line #3 on RX2A, the Telco receive line #2 on RX3A, and the Telco receive line #1 on RX4A. The receive switch 34 has the DTMF receiver 40 connected to the RX1B line, the call progress processor 42 connected to the RX2B line, the FSK modem receiver 44A connected to the RX3B line, and the local phone receiver 46 connected to the RX4B line. Still further, it can be seen that the transmit switch 38 has as its inputs the DTMF/pulse dialer 50 connected to the TX1A line, the sum amplifier 52 connected to the TX2A line, the FSK modem transmitter 44B connected to the TX3A line, and the local phone transmitter 48 connected to the TX4A line. Still further, the transmit switch 38 has the Telco transmit line #4 connected to the TX1B line, the Telco transmit line #3 connected to the TX2B line, the Telco transmit line #2 connected to the TX3B line, and the Telco transmit line #1 connected to the TX4B line.

In accordance with the invention, the CPU 24 will execute a sequence of stored program instructions in the RAM 20, to carry out various call processing interconnection functions by applying a sequence of receive switch control words to the decoder 33 in the receive switch 36 and the sequence of transmit switch control words to the decoder 37 in the transmit switch 38. This will selectively interconnect a plurality of telephone lines such as the Telco lines 1, 2, 3 and 4 with the DTMF receiver 40, the call progress processor 42, the FSK modem 44, the local phone 49, the DTMF/pulse dialer 50, the sum amplifier 52, and other shared resource elements, in order to achieve functions such as call progress tone monitoring, answer tone monitoring, call forwarding between a first line and a second line, call conferencing with up to five users, DTMF tone monitoring (including the recordation and display of the last number dialed), data modem switching onto any line, selective line hold function, selective private conversation in a multi-user conversation mode, and other multiple line/multiple resource applications. Examples of some of these applications are depicted in FIGS. 5 through 8.

Figure 5:
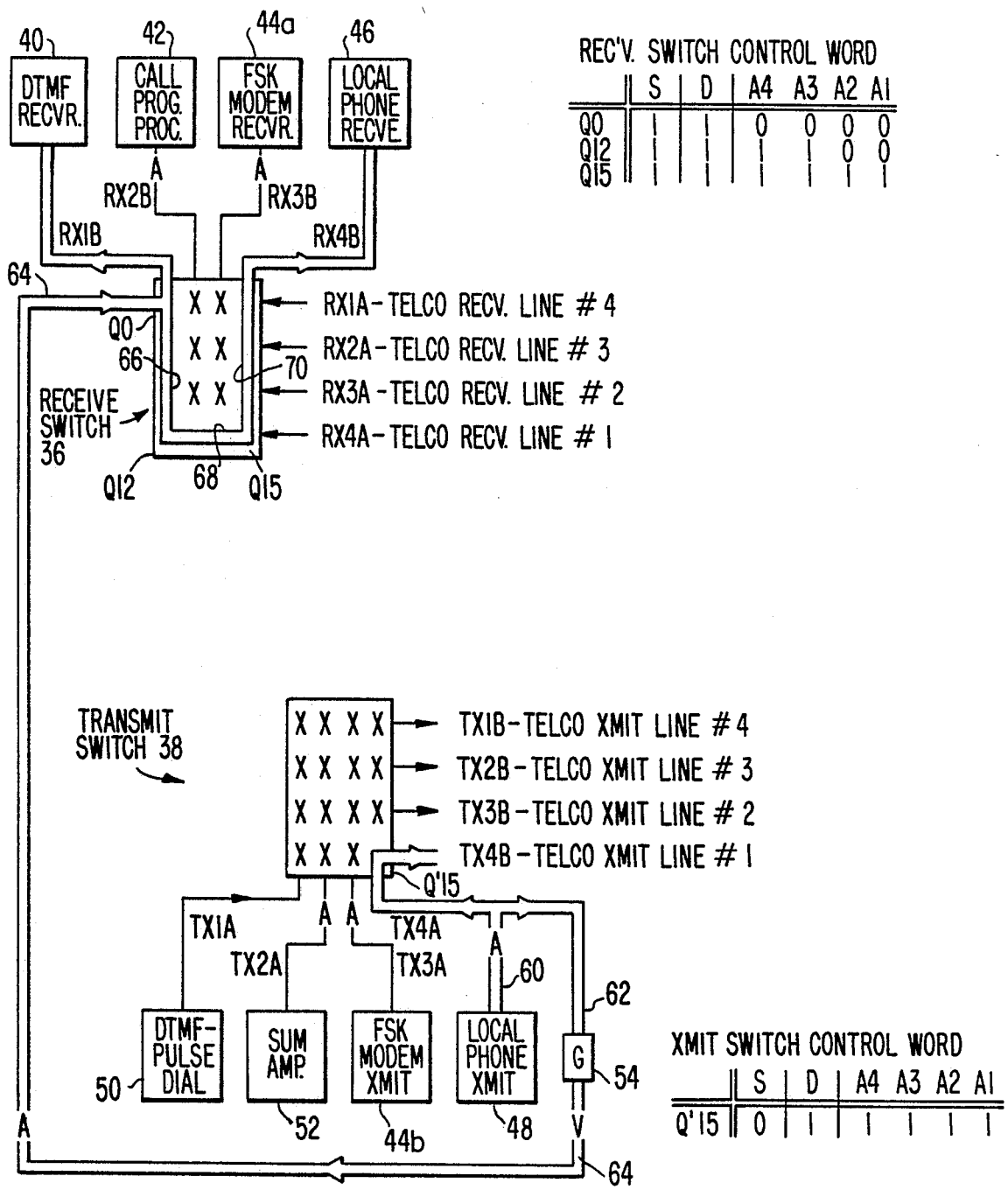
FIG. 5 is a schematic diagram of an example of the micro-PBX performing manual dialing with storage of the last number dialed.

FIG. 5 depicts the micro-PBX 34 in a schematic diagram, performing manual dialing with the storage of the last number dialed. Under the control of stored program instructions, the CPU 24 applies a sequence of three receive switch control words to switch the state of elements Q0, Q12 and Q15 of the receive switch 36, as shown in FIG. 5. The CP 24 further applies a transmit switch control word to set the state of the element Q'15 in the transmit switch 38, as shown in FIG. 5. As a result, as manual dialing proceeds with the local phone transmitter 48 using dual tone mulitfrequency keys, the tone signals are output on line 60 and are applied through the conductive switch element Q'15 of the transmit switch 38 to the Telco transmit line #1. The DTMF tones on line 60 are also applied over line 62 through the gate 54 and over the line 64 to the RX1A line of the receive switch 36. Line 64 is connected through the conductive element Q0 to the RX1B line, applying the tone signals to the DTMF receiver 40. The DTMF receiver 40 will convert the tone signals into digital values which are passed back to the CPU 24 and stored as the last number dialed. Later, this number can be called up and automatically applied to dial the last number, as desired. Line 64, being connected through the element Q0 in the receive switch 36, passes over line 66 to the conductive element Q12 where it continues to propagate over the line 68 to the conductive element Q15. Conductive element Q15 passes the signal from line 68 to line 70 and then out onto the RX4B line to the local phone receiver 46, so as to enable the local user to listen to his DTMF tones as dialed. An important advantage accruing from the invention is that a different pattern of receive switch control words is applied to the receive switch 36 than the pattern of transmit switch control words applied to the transmit switch 38. This is an illustration of the flexible connectivity of the dual plane cross point switch architecture, in accordance with the invention.

Figure 6:
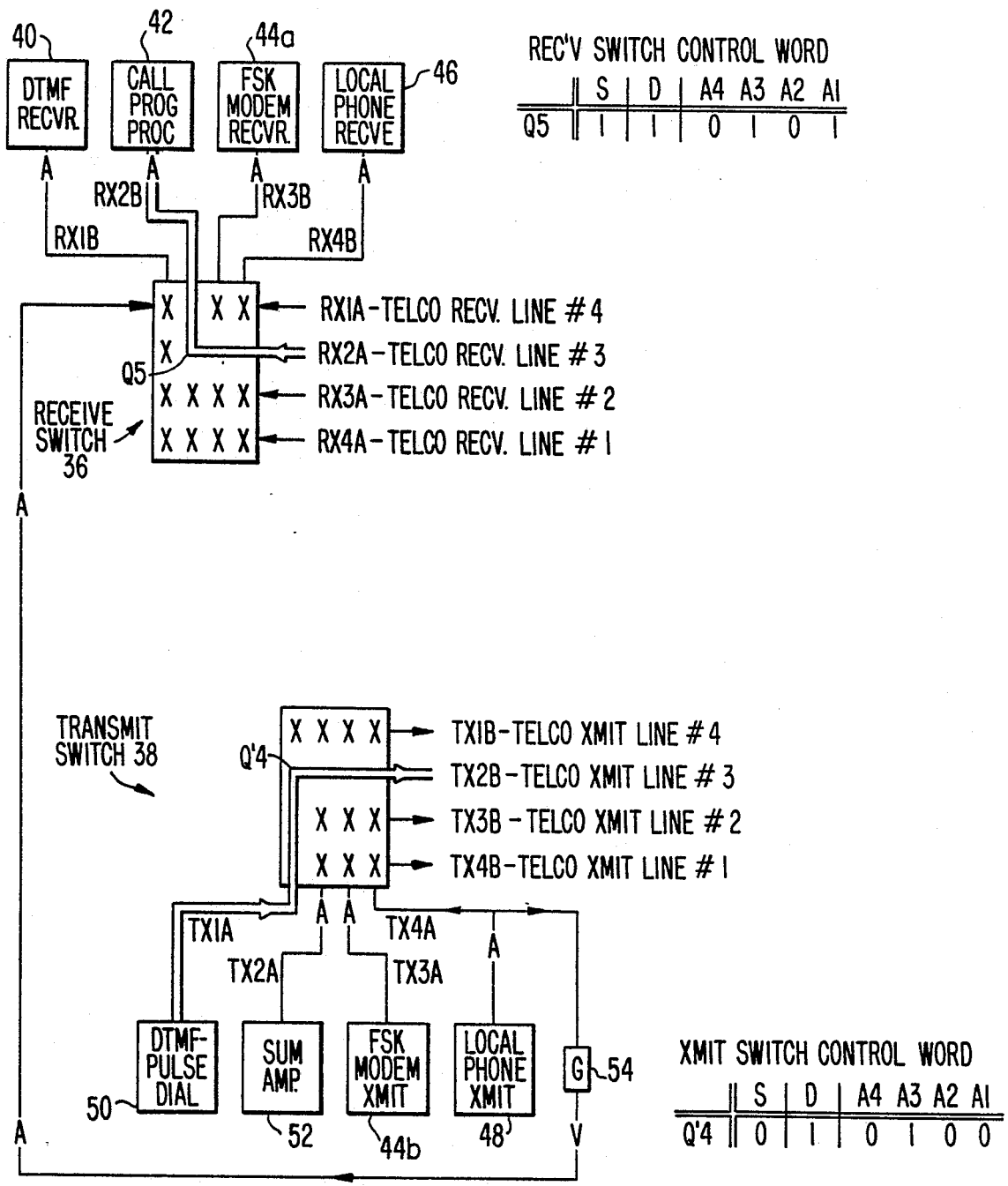
FIG. 6 is a schematic diagram of an example of the micro-PBX performing auto dialing and call progress monitoring.

FIG. 6 is a schematic diagram of the micro-PBX 34, carrying out an auto dialing and call progress monitoring function. The CPU 24, under control of the stored program instructions in the RAM 20, will apply the receive switch control word for the element Q5 shown in FIG. 6 and the transmit switch control word for the element Q'4 shown in FIG. 6. This will connect the RX2A line for the Telco receive line #3 through the element Q5 of the receive switch 36, to the line RX2B connected to the call progress processor 42 of FIG. 6. The transmit switch 38 will have the DTMF/pulse dialer 50 connected by means of line TX1A, through the element Q'4 of the transmit switch 38, to the line TX2B for the Telco transmit line #3. This will enable the CPU 24, under the control of stored program instructions in the RAM 20, to operate the DTMF/pulse dialer 50 to issue a sequence of tones out onto the Telco transmit line #3. This will also permit the call progress monitor 42 to listen to the progress of the call placement along the trunk lines interconnecting the local station to the remote station being dialed, by listening to those call progress tones being fed back from the receive line #3 to the receive switch 36 on the RX2A line.

Figure 7:
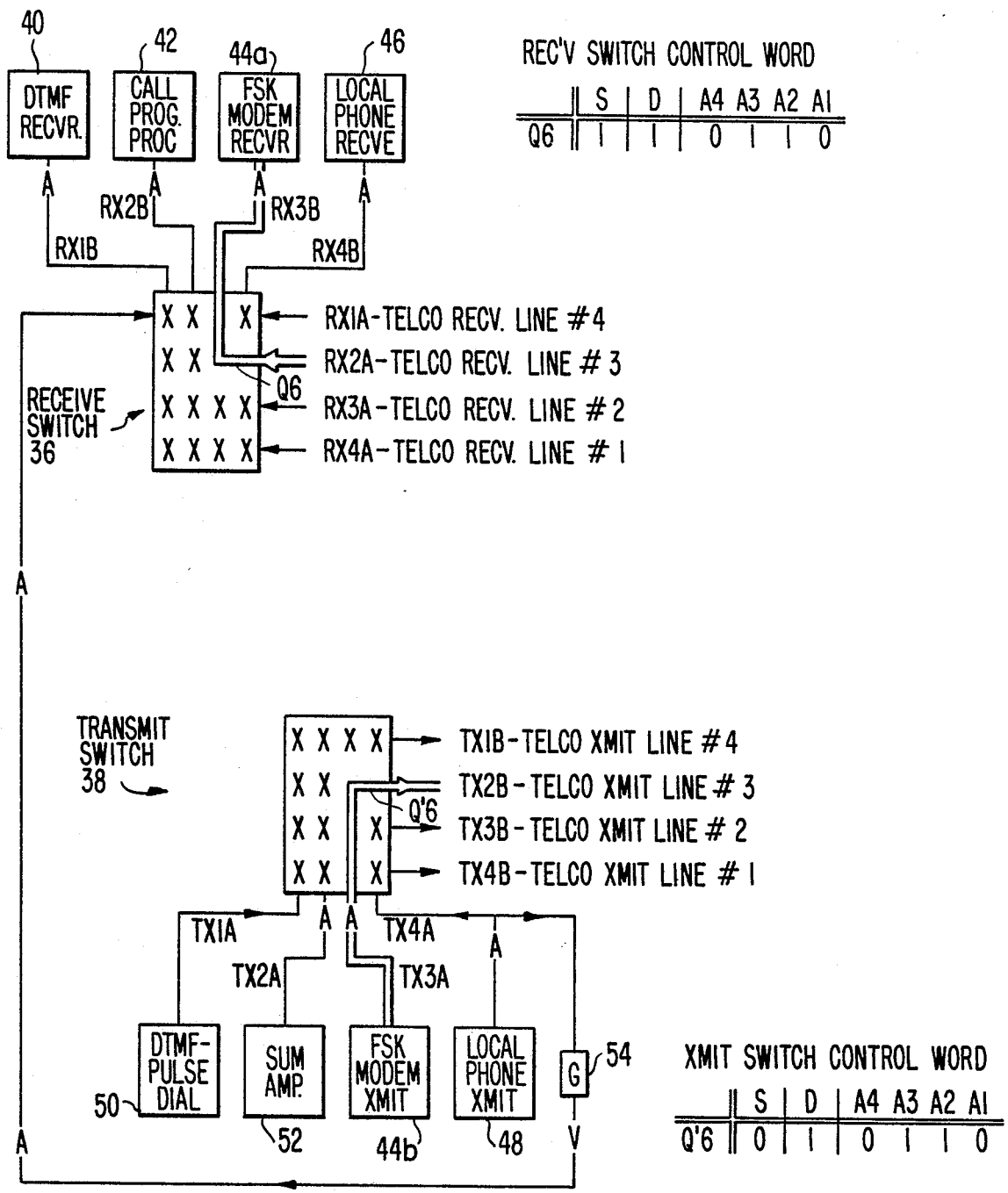
FIG. 7 is a schematic diagram of an example of the micro-PBX performing FSK modem transmit and receive operations.

FIG. 7 is a schematic diagram of the micro-PBX 34 illustrating an example stage which might occur after that depicted in FIG. 6, where the FSK modem will enter into transmit and receive operations, after the successful completion of the placement of the call carried out by the operation of FIG. 6. In FIG. 7, the receive switch control word for Q6 and a transmit switch control word for Q'6 are supplied by the CPU 24 under the control of the stored program instructions in the RAM 20. This will set the Q6 element in the receive switch 36 so as to connect the RX2A line for the Telco receive line #3, to the FSK modem receiver 44A over the RX3B line. Also, the transmit switch control word will cause the Q'6 element to connect the FSK modem transmitter 44B over the line TX3A, to the Telco transmit line #3 over the line TX2B.

Figure 8:
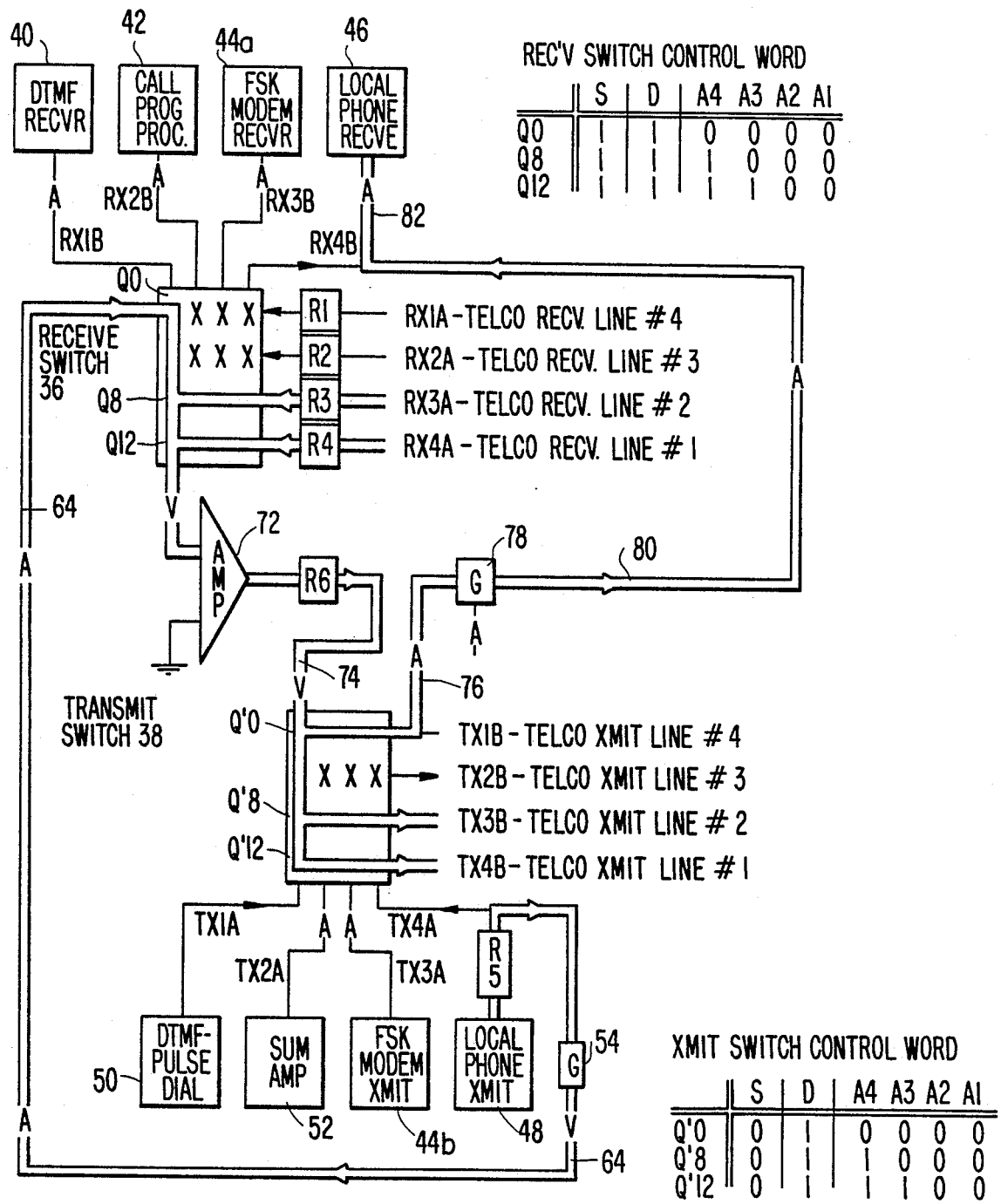
FIG. 8 is a schematic diagram of an example of the micro-PBX performing conference summing.

FIG. 8 shows an improved conference summing configuration used in conjunction with the dual plane cross point switch architecture. FIG. 8 shows the build-out resistors R1, R2, R3 and R4 which are connected between the receive switch 36 lines RX1A, RX2A, RX3A and RX4A and the corresponding Telco receive lines #4, #3, #2 and #1, respectively. Also connected to the RX1B line of the receive switch 36 is the negative terminal of the summing amplifier 72, the positive terminal of which is connected to ground potential. The output of summing amplifier 72 is connected through resistor R6 to line 74 which connects to the TX1A line of the transmit switch 38. Also shown in FIG. 8 is the line 76 which is tapped into the TX1B line from the transmit switch 38 and which connects through the gate 78 to line 80 which is connected to the RX4B line of the receive switch 36 and, by lines 82, to the local telephone receiver 46. The local phone transmitter 48 is connected through the build-out resistor R5, through the gate 54 to line 64 which is connected to the line RX1A of the receive switch 36. The CPU 24, under control of the stored program instructions in the RAM 20, provides the receive switch control words for Q0, Q8 and Q12 as shown in FIG. 8, enabling the common connection of the local phone transmitter 48 through its build-out resistor R5, the Telco receive line #2 through its build-out resistor R3, and the Telco receive line #1 through its build-out resistor R4, to a common node which is connected to the negative terminal of the summing amplifier 72. This effectively provides the analog summing of the signals from the local phone transmitter 48, and the Telco receive lines #2 and #1, within the receive switch 36, providing the means for establishing a conference interconnection. The output of the amplifier 72, which passes through the resistor R6 and over the line 74 to the transmit switch 38, allows the analog sum of the signals to be distributed to the local telephone receiver 46 by means of the line 76, and to the Telco transmit line #2 over line TX3B and to the Telco transmit line #1 over the line TX4B from the transmit switch 38. The summing amplifier 72 can include a feedback resistor from its output to the input line thereof in classic summing amplifier configuration.

Typically the resistance of the transfer gate devices Q0, Q8 and Q12 in the receive switch 36 is between 200 and 400 ohms. In order to overcome the signal attenuation which would normally be incurred through the passage of an analog signal through such a connection in the receive switch 36, the build-out resistors R3, R4 and R5 are designed to have a resistance of approximately 22,000 ohms. In this manner, if one or more cross point switch elements Q0, Q8 or Q12 are connected serially through a particular analog connection from line 64 to the summing amplifier 72, for example, the relative attenuation of the signal will be minimal.

The single output from the summing amplifier 72 is connected through the resistor R6 which has a resistance of approximately 5,000 ohms, over line 72 to the single input port at transmit switch 38.

Thus it is seen that by performing the signal summation of the three voice signals from the local telephone transmitter 48, and the Telco receive lines #2 and #1, at the electrically common connection within the cross point receive switch 36, a single output line can be applied to the summing amplifier 72 for the algebraic summation of the three analog signals. The output of the summing amplifier 72 is the algebraic sum of the three analog signals and that algebraic sum is applied over line 74 and through the transmit switch 38 to the local phone receiver 46, and the Telco transmit lines #2 and #1. In this manner, efficient utilization of the ports of the receive switch 36 and the transmit switch 38 is achieved.

In addition, by the selection of the relative resistances of the build-out resistors R1 through R5 with respect to the inherent switch resistance in the receive switch 36 and the transmit switch 38, minimal signal attenuation is encountered.

The resultant dual plane cross point switching architecture enables a full range of interconnectivity between shared resource elements such as DTMF tone monitoring and generation units, voice storage and playback units, modems, and the Telco communication lines or local telephone handsets.

Although a specific embodiment of the invention has been disclosed, it will understood by those of skill in the art that changes can be made to the specific embodiment disclosed without departing from the spirit and the scope of the invention.

What is claimed is:

1. In a micro-PBX system, a telephone switching network for interconnecting a plurality of dissimilar shared telephone resource units, comprising:

a software reconfigurable cross point switch having a first switching plane for interconnecting a first subplurality of shared telephone resource units and having a second, idependently switched switching plane for selectively interconnecting a second subplurality of shared telephone resource units;

a stored program data processing means having an input/output bus connected to a control input of said cross point switch, for selectively setting the switching state of switching elements in said first and said second switching planes thereof;

said send and the receive paths in a telephonic communications session being independently switched between respective ones of said shared telephone resource units;

at least two telephone receive lines connected through respective build-out resistors to a common node in said first switching plane;

a summing amplifier having an input connected to said common node in said first switching plane and an output connected through an impedance device to an input node of said second switching plane;

said input node of said second switching plane being connected to transmit lines associated with said receive lines;

whereby the analog signals on said receive lines can be algebraically summed for telephone conference communications.

* * * * *